H. D. TIEMANN.
APPARATUS FOR DRYING TIMBER AND OTHER MOISTURE BEARING SUBSTANCES.
APPLICATION FILED MAR. 15, 1910.
1,019,999.
Patented Mar. 12, 1912.
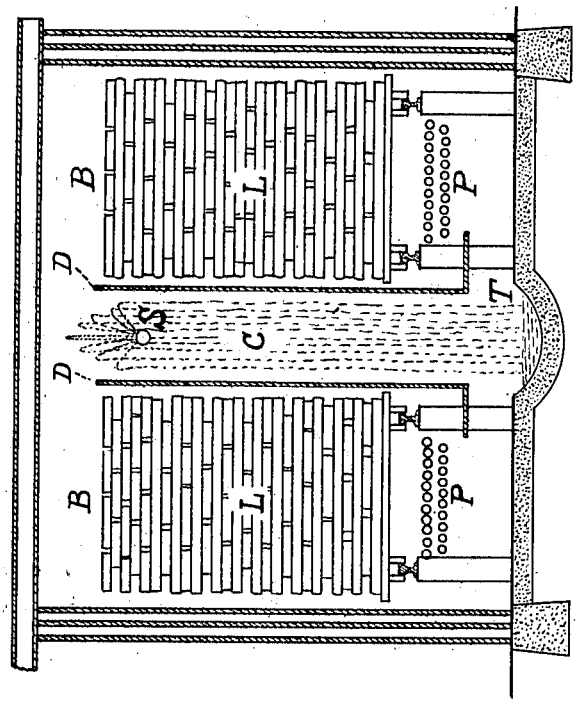
Witnesses
Thomas G. Shearman
L. W. Williams Jr.
Inventor
Harry D. Tiemann

UNITED STATES PATENT OFFICE.

HARRY D. TIEMANN, OF WASHINGTON, DISTRICT OF COLUMBIA.

APPARATUS FOR DRYING TIMBER AND OTHER MOISTURE-BEARING SUBSTANCES.

1,019,999.  Specification of Letters Patent.  Patented Mar. 12, 1912.

Application filed March 15, 1910. Serial No. 549,571.

(DEDICATED TO THE PUBLIC.)

*To all whom it may concern:*

Be it known that I, HARRY D. TIEMANN, a citizen of the United States, and an employee of the Forest Service, United States Department of Agriculture, a legal resident of the District of Columbia, residing at the city of Washington therein, (whose post-office address is 1714 Q street,) have invented new and useful Improvements in Apparatus for Drying Timber and other Moisture-Bearing Substances, and have made application, by petition of even date herewith, under the act of March 3, 1883, chapter 143, (22 Stat., 625,) praying that Letters Patent therefor may be granted to me.

The invention herein described and claimed may be used by the Government of the United States or by any of its officers or employees in the prosecution of work for the United States, or by any person in the United States, without payment of any royalty thereon.

The following is the specification of the invention:

My invention relates to an improvement in dry kilns for lumber or in chambers for drying moisture bearing substances.

The object of my invention is to increase within the kiln the local circulation of air and at the same time to reduce the humidity a certain degree by the use of water, or a spray of water, as a condenser at a temperature lower than that of the air.

In the ordinary condensing kilns, the moisture is condensed from the air in a separate compartment or an auxiliary chamber by causing the moist air to come into contact with metallic surfaces cooled below the dew point of the air. The most objectionable feature of these kilns is the expense of maintaining the condensers, which rapidly become corroded with the moist acid fumes from the lumber. My invention, by the use of a spray of water in place of the metallic surfaces, overcomes this difficulty and more effectually accomplishes the desired result, as the water may be brought into more intimate association with the air than is possible with metallic condensers. It is commonly thought that a spray of water will add humidity to the air. As a matter of fact, if the spray is colder than the dew point of the air, and not too finely divided, it will abstract moisture therefrom, acting as a condenser. By regulating the temperature of the water, the degree of reduction of the humidity may be controlled.

The nature, characteristic features and scope of my invention will be more readily understood by the following description taken in connection with the accompanying drawing.

The figure is a cross section of my form of apparatus.

Referring to the drawing, B—B represent a pair of drying chambers provided with heating pipes, P—P, at their lower ends. Within said chambers are also arranged tracks upon which roll the trucks of lumber, L—L, to be dried. D—D indicate partitions which separate the drying chambers, B—B, from the auxiliary chamber, C, in which is arranged the water condenser, S. This condenser, S, is so arranged as to produce a gentle spray or rain of drops of water over a surface. The water falls into the trough, T, by which it is removed from the chambers. The degree to which the humidity is reduced depends upon the temperature of the water, so that by properly regulating the temperature of the water any desired humidity less than saturation may be obtained. The chambers, B—B, communicate with each other by an open space at their top and bottom ends as shown in the drawing.

The operation of drying within the chambers is as follows: The heated air from the heating apparatus, P P, passes upward in the respective chambers, B—B, through the lumber, L—L, absorbing moisture therefrom and thereby becoming lighter. The air then passes into the auxiliary condensing chamber, C, where it comes in contact with the cooler water, and is cooled and deprived of a certain part of its moisture through condensation upon the water. As a result the air is rendered heavier, and naturally descends, due to its greater density. From the auxiliary condensing chamber, C, the air then passes again through the heater and rises through the pile of lumber in the respective drying chambers, B—B, supplying the necessary heat to evaporate the moisture and at the same time, being deprived of only certain portion of its moisture, prevents too rapid surface drying by the amount of relative humidity which it retains, depending on the temperature of the condenser and the temperature to which it is raised by the heater. In certain cases, as in drying green lumber, it may be desirable at the beginning of the drying process to humidify the air as it leaves the condenser and enters the chambers, B—B, by contact either with free steam or with water treated above the temperature of the air. The only office of the condenser at this stage of the process would be to increase the circulation which means the heating efficiency. Such a condition would be discontinued after the lumber became completely heated through and the drying operation ready to begin.

In the drawing I have illustrated one way in which the auxiliary chambers containing the water condenser may be used in connection with dry kilns for lumber. I do not restrict myself, however, to its use with any specific type of kiln or drying apparatus, as it is manifest that it can be used with almost any form of drying chamber.

The direct benefits to be derived are an increased circulation of the drying medium, thereby securing more rapid and uniform heating of the wood by supplying the necessary heat to produce the evaporation, and the prevention of hardening and similar evil results by the elimination of excessive surface evaporation due to holding the humidity of the air at the proper degree. By using the second heating medium in closed circuits, there is less loss of heat, since it is in general not necessary to cool the air in the condenser as low as the temperature of the outside air. Hence a better product would be obtained in less time and at smaller cost, than by other known methods.

Having thus described my invention, I claim:

In a kiln comprising a pair of drying chambers provided with heating pipes, said chambers communicating at their upper and lower ends with each other, a condenser arranged between said chambers, said condenser consisting of a water spray at a temperature less than that of the air for producing greater circulation and regulating the humidity of the air by the temperature of the water.

Signed at Washington, D. C., this eleventh day of March, 1910.

HARRY D. TIEMANN.

Witnesses:
 THOMAS G. SHEARMAN,
 R. W. WILLIAMS, Jr.